United States Patent [19]

Matsumoto

[11] Patent Number: 4,576,240

[45] Date of Patent: Mar. 18, 1986

[54] HYDRAULIC IMPACT DEVICE

[75] Inventor: Minoru Matsumoto, Katano, Japan

[73] Assignee: Kabushiki Kaisha Komatsu Seisakusho, Tokyo, Japan

[21] Appl. No.: 435,247

[22] Filed: Oct. 19, 1982

[30] Foreign Application Priority Data

Oct. 19, 1981 [JP] Japan ............................... 56-154055

[51] Int. Cl.[4] ............................................ B23B 45/16

[52] U.S. Cl. ............................ 173/105; 173/DIG. 3; 192/67 R

[58] Field of Search ................. 173/105, 116, 163, 47, 173/48, 104, 12, 58.4, 93.5, 97, DIG. 3; 251/355; 277/9.5; 184/103 R; 192/67 R, 70.12; 403/359, 1; 408/132; 81/429, 473, 474

[56] References Cited

U.S. PATENT DOCUMENTS

| | | | |
|---|---|---|---|
| 2,979,161 | 4/1961 | Lyden | 184/103 R |
| 3,146,811 | 9/1964 | Shryock | 81/429 |
| 3,837,409 | 9/1974 | Consoli et al. | 192/67 R |
| 3,921,731 | 11/1975 | Ekwall et al. | |
| 3,934,629 | 1/1976 | Boman | 81/429 |
| 4,159,050 | 6/1979 | Hopkins, Sr. et al. | 192/67 R |
| 4,206,820 | 6/1980 | Bailey et al. | 173/105 |

*Primary Examiner*—Donald R. Schran
*Assistant Examiner*—James L. Wolfe
*Attorney, Agent, or Firm*—Armstrong, Nikaido, Marmelstein & Kubovcik

[57] ABSTRACT

A hydraulically powered impact device for rock drilling having an impact piston driven by a hydraulic drive unit and a shank rod adapted to be struck by the impact piston. A motor imparts a rotary motion to the shank rod by rotating a sleeve through a gear train. The sleeve is rotatably mounted around the shank rod. A chuck is splined to the shank rod and a dog clutch is provided between the sleeve and the chuck for engaging both. A fluid passage is formed for introducing lubricant fluid stored in a gear casing into a chamber accommodating the dog clutch. The fluid passages includes a valve which is held open as long as the cover is connected to the main casing.

2 Claims, 4 Drawing Figures

HYDRAULIC IMPACT DEVICE

BACKGROUND OF THE INVENTION

This invention relates to a hydraulic impact device or a drifter device provided with an improved power transmission unit for transmitting the rotation of a motor to a shank rod.

There has so far been employed a crawler vehicle mounted drill provided with a drifter device adapted to give impact and rotation to the shank rod when drilling rocks or the like. The prior art drifter device comprises, for example, a shank rod which is rotatably and reciprocably mounted on the leading end of the drifter body, and is arranged such that a striker piston reciprocated by a hydraulic unit gives an impact force to the shank rod and a rotational force is transmitted by a rotary motor through a power transmission means to the shank rod. The conventional power transmission means have been constructed such that the rotation of the rotary motor can be transmitted from a gear to a sleeve and then through bolts and knock pins to a chuck which is engaged by splines formed thereon with the shank rod. For this reason, the bolts tend to get loose in operation resulting in fracture of the bolts and/or the knock pins, and therefore such troubles as the rotation of the motor cannot be transmitted to the shank rod have so far occurred frequently.

SUMMARY OF THE INVENTION

It is therefore an object of the present invention to provide a hydraulic impact device for rock drilling which overcomes the above noted problems of the prior art.

Another object of the present invention is to provide a hydraulic impact device for rock drilling which can positively transmit a rotary motion of a motor to a shank rod by employing a dog clutch.

A further object of the present invention is to provide a hydraulic impact device for rock drilling in which a positive lubrication for a dog clutch and other parts is provided with a simple lubrication system.

In accordance with an aspect of the present invention, there is provided a hydraulic impact device for rock drilling, comprising: a housing; an impact piston slidably mounted within said housing; hydraulic means for driving said impact piston; a shank rod mounted within said housing, said shank rod being adapted to be struck at one end thereof by said impact piston; motor means for imparting a rotary motion to said shank rod, said motor means being mounted to said housing; a sleeve rotatably mounted around said shank rod; a chuck splined to said shank rod; clutch means for engaging said sleeve with said chuck; and means for transmitting the rotary motion of said motor means to said sleeve.

In a preferred embodiment, the clutch means is a dog clutch or claw clutch.

The above and other objects, features and advantages of the present invention will be readily apparent from the following description taken in conjunction with the accompanying drawings.

DESCRIPTION OF THE PREFERRED EMBODIMENT

Figure 1:
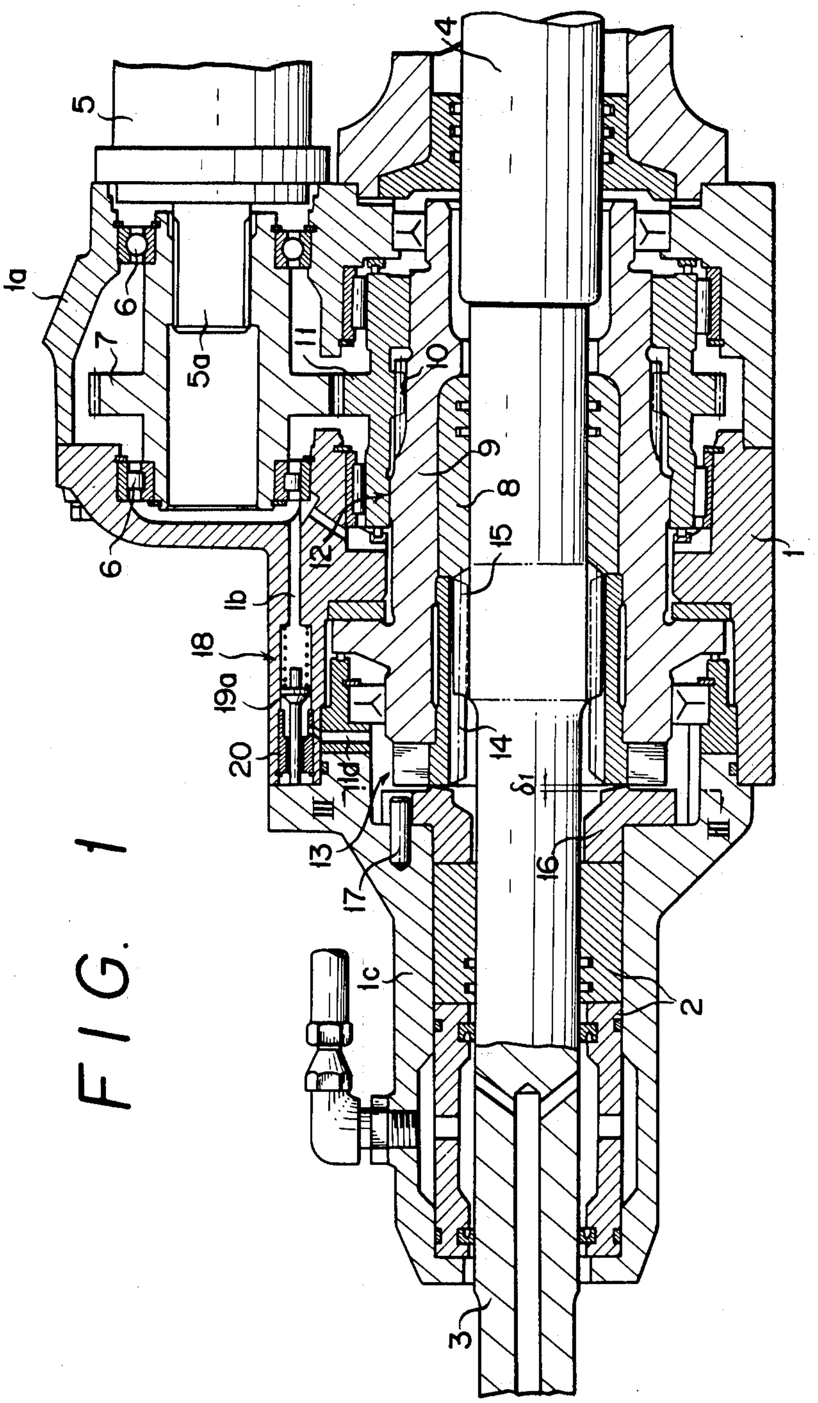
FIG. 1 is a longitudinal cross-sectional view of a hydraulic impact device according to the present invention.

The present invention will now be described in detail below by way of example only with reference to the accompanying drawings. Reference numeral 1 denotes a drifter body which includes at the leading end along the longitudinal center thereof a shank rod 3 which is rotatably and reciprocably carried by a bush 2. Slidably mounted behind (on the right hand in FIG. 1) the shank rod 3 is a striker piston 4 which is reciprocated by means of a hydraulic unit (not shown) and is adapted to strike against the rear end of the shank rod 3. Fitted to the end face of a gear case 1*a* mounted on the outer periphery of the drifter body 1 is a rotary motor 5 having a splined shaft 5*a* that is engageable with a gear 7 carried by way of bearings 6 within the gear case 1*a*. Further, the gear 7 is arranged to mesh with a gear 11 having a spline formed thereon which is engaged as shown at 10 with the spline formed on a part of a sleeve 9 rotatably carried by the shank rod 3 through a bushing 8, thereby forming part of a power transmission means 12 for transmitting the rotation of the rotary motor 5 to the shank rod 3.

Figure 2:
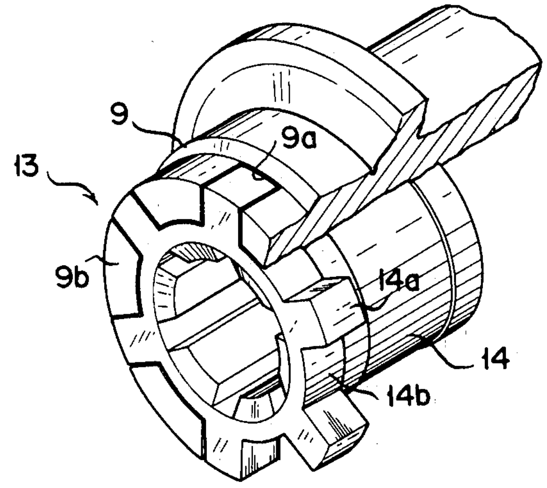
FIG. 2 is a perspective view, partly broken away for clarity, of a coupling portion including a dog clutch between a sleeve and a chuck.
Figure 3:
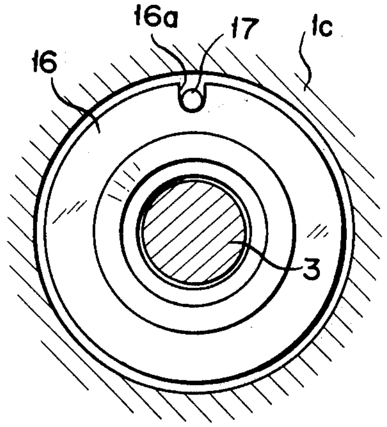
Fig. 3 is a cross-sectional view taken along the line III—III of Fig. 1.

A chuck 14 is engaged with the sleeve 9 through a dog clutch 13 mounted on the end of the sleeve 9. The dog clutch 13 is comprised of, as shown in FIG. 2, a plurality of recesses 9*a* and projections 9*b* alternately formed on the peripheral end face of the sleeve 9 and the same number of projections 14*a* and recesses 14*b* alternately formed on the peripheral end face of the chuck 14, which projections 14*a* and recesses 14*b* are adapted to engage with the recesses 9*a* and the projections 9*b* of the sleeve 9, respectively. The chuck 14 within the sleeve 9 is engaged by its spline 15 with the shank rod 3 so that the rotation of the sleeve 9 may be transmitted through the dog clutch 13 and the chuck 14 to the shank rod 3.

The reference numeral 16 denotes a stopper which is mounted opposite to the end face of the chuck 14 on the side of the dog clutch 13 with a slight clearance $\delta_1$ and which is press fit or clearance fit inside a cover 1*c* attached to the leading end of the drifter body 1. One end of a pin 17 serving as a turning stopper and having the other end inserted in the cover 1*c* is fitted in a notch 16*a* of the stopper 16 thereby preventing the stopper 16 from turning relative to the cover 1*c*. Further, the axial movement of the stopper 16 due to the vibration which takes place in operation is limited by the chuck 14 mounted opposite to the stopper 16 with the clearance $\delta_1$ kept therebetween. Moreover, the turning torque tending to turn the stopper 16 in company with the rotation of the chuck 14 is minimized by the provision of the clearance $\delta_1$ thereby eliminating the risk of fracture of the turning stopper pin 17 due to the turning of the stopper 16 in company with the rotation of the chuck 14. The contact surfaces of the dog clutch 13 and the stopper 16 are preferably hardened by a heat treatment such as carburizing.

Figure 4:
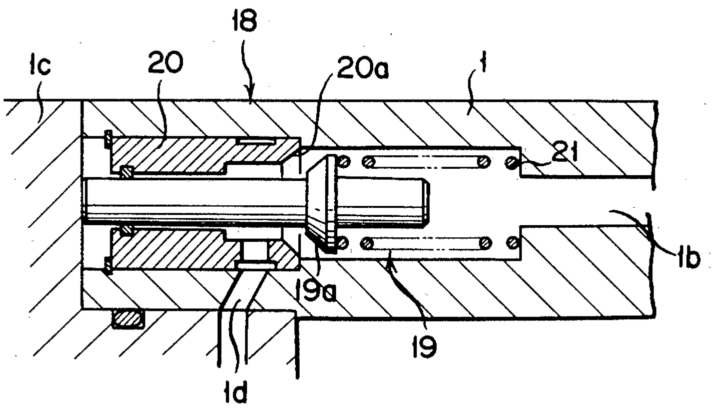
FIG. 4 is enlarged longitudinal cross-sectional view showing a check valve mounting according to the present invention.

Whilst, reference numeral 18 denotes a lubricating means for supplying the lubricating oil filled in the gear case 1*a* into the dog clutch 13 etc. The lubricating means 18 includes a check valve 19 installed in its oil passage 1*b*. The check valve 19 comprises, as shown in FIG. 4, a spool 19*a* urged by a compression spring 21 against a valve seat 20*a* formed in the end face of a bushing 20 which is inserted in the oil passage 1*b* from the side of the cover 1*c* which is detachably mounted in the leading end of drifter body 1. The spool 19*a* is arranged, when urged by the end face of the cover 1*c*, to move to the right in FIG. 4 against the biasing force of the compression spring 21. As a result, the spool 19*a* is disengaged from the valve seat 20*a*. Under the condition that the cover 1*c* is fitted to the drifter body 1, the spool 19*a* is disengaged from the valve seat 20*a* so that lubricating oil stored in the gear case 1*a* may be supplied through the oil passages 1*b* and 1*d* into the dog clutch 13 etc.

As mentioned in detail hereinabove, according to the present invention, because the power transmission unit 12 is adapted to transmit the rotational force transmitted from the motor 5 to the sleeve 9 to the shank rod 3 by means of the chuck 14 engaged through the dog clutch 13 with the sleeve 9, the disadvantage of the prior art drifter device employing bolts and knock pins can be eliminated, and also it becomes possible to assemble the sleeve 9 and the chuck 14 only by engaging the dog clutch 13 thus enabling the assembly operation to be effected in a shorter time than that required in the case of the prior art drifter device.

Further, because when the spool 19*a* is urged by the cover 1*c* against the force of the spring 21 the lubricating oil stored in the gear case 1*a* is supplied through the check valve 19 and through the oil passage 1*d* into the dog clutch 13 and the sliding contact portions between the shank rod 3 and the chuck 14 etc., the labour required for feeding the lubricating oil into the shank rod 3 frequently becomes unnecessary thereby enabling the maintenance and repairs to be made easily. Also it becomes possible to eliminate the possibility of occurrence of abnormal wear and seizure of the sliding parts of the shank rod 3 resulting from the negligence in supplying the lubricating oil thereto. Further, when the cover 1*c* fitted to the leading end of the drifter body 1 is removed to replace the shank rod 3 with new one, the pressure exerted by the cover 1*a* on the check valve 19 is released to close the check valve 19, and therefore, such a trouble as the lubricating oil stored in the gear case 1*a* flows out wastefully can be avoided.

While the invention has been particularly shown and described with reference to a preferred embodiment thereof, it will be understood by those skilled in the art that the foregoing and other changes in form and details can be made therein without departing from the spirit and scope of the invention.

What is claimed is:

1. A hydraulic impact device for rock drilling, comprising:

a housing comprising a main casing, a gear casing containing a lubricating fluid, and a cover removably mounted to said main casing;

an impact piston slidably mounted within said housing main casing;

hydraulic means for driving said impact piston;

a shank rod mounted within said removable housing cover, said shank rod being adapted to be struck at one end thereof by said impact piston;

motor means for imparting a rotary motion to said shank rod, said motor means being mounted to said housing;

a sleeve rotatably mounted around said shank rod and having a peripheral end face;

a chuck having a peripheral end face and being splined to said shank rod;

clutch means for engaging said sleeve with said chuck comprising a dog clutch positioned in a chamber of said main casing and formed by alternating projections and recesses on said peripheral end face of said sleeve and corresponding alternating projections and recesses on said peripheral end face of said chuck adapted to engage said alternating projections and recesses to said sleeve;

transmission means accommodated in a chamber of said gear casing for transmitting the rotary motion of said motor means to said sleeve;

a passage formed in said main casing between said gear casing chamber and said chamber accommodating said dog clutch; and valve means mounted in said passage and operating to establish communication between said gear casing chamber and said dog clutch chamber when said cover is mounted to said main casing, and to block communication therebetween when said cover is removed from said main casing, whereby said lubricating fluid is introduced into said dog clutch chamber as long as said cover is mounted to said main casing.

2. A hydraulic impact device as recited in claim 1 further comprising a stopper mounted to said cover with a slight clearance from a leading end of said chuck.

* * * * *